March 5, 1940. A. C. PAGE 2,192,200
FLOW CONTROL AND METERING DEVICE
Original Filed Feb. 17, 1936  6 Sheets-Sheet 1
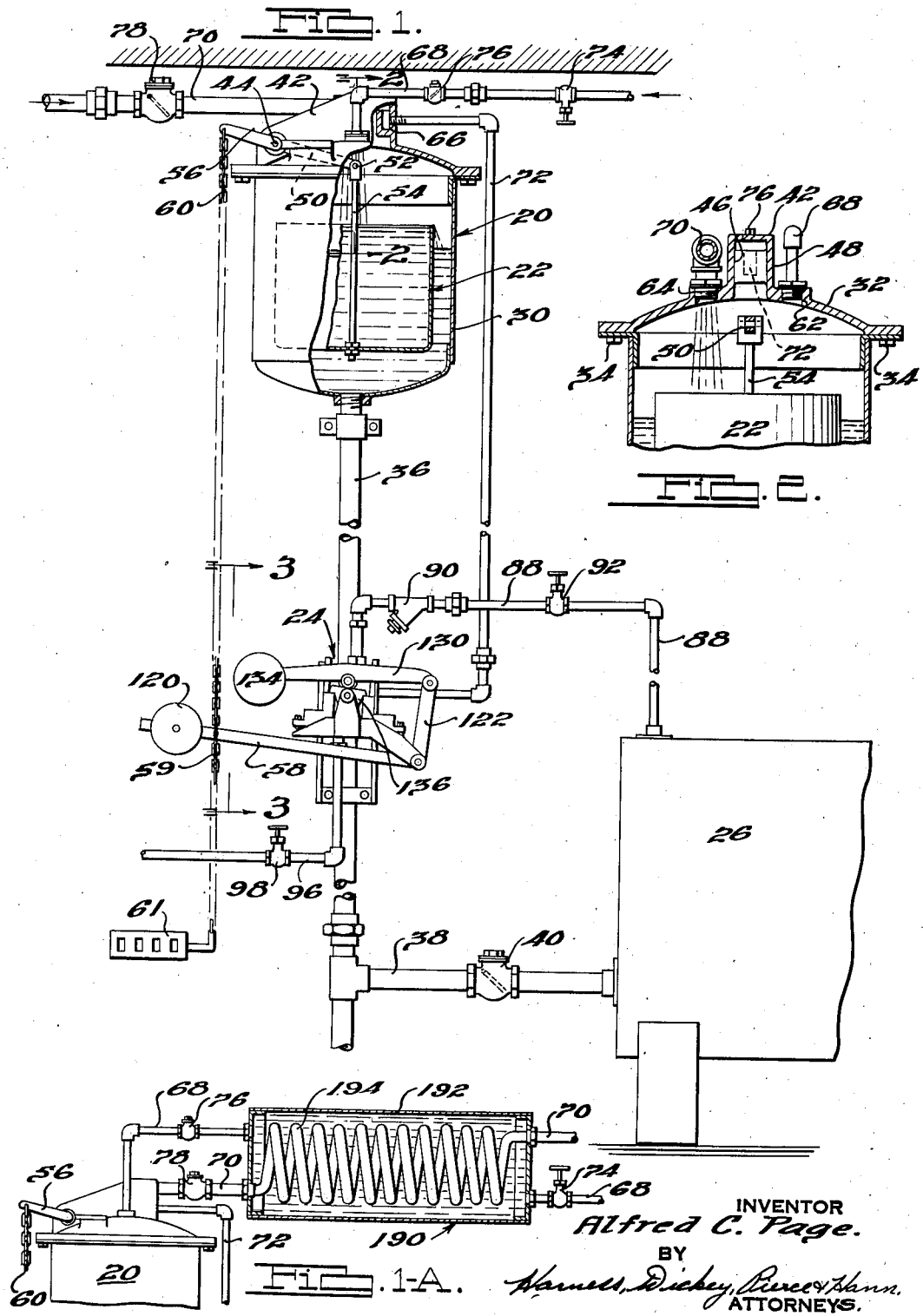
INVENTOR
Alfred C. Page.
BY
ATTORNEYS.

March 5, 1940. A. C. PAGE 2,192,200
FLOW CONTROL AND METERING DEVICE
Original Filed Feb. 17, 1936 6 Sheets-Sheet 2
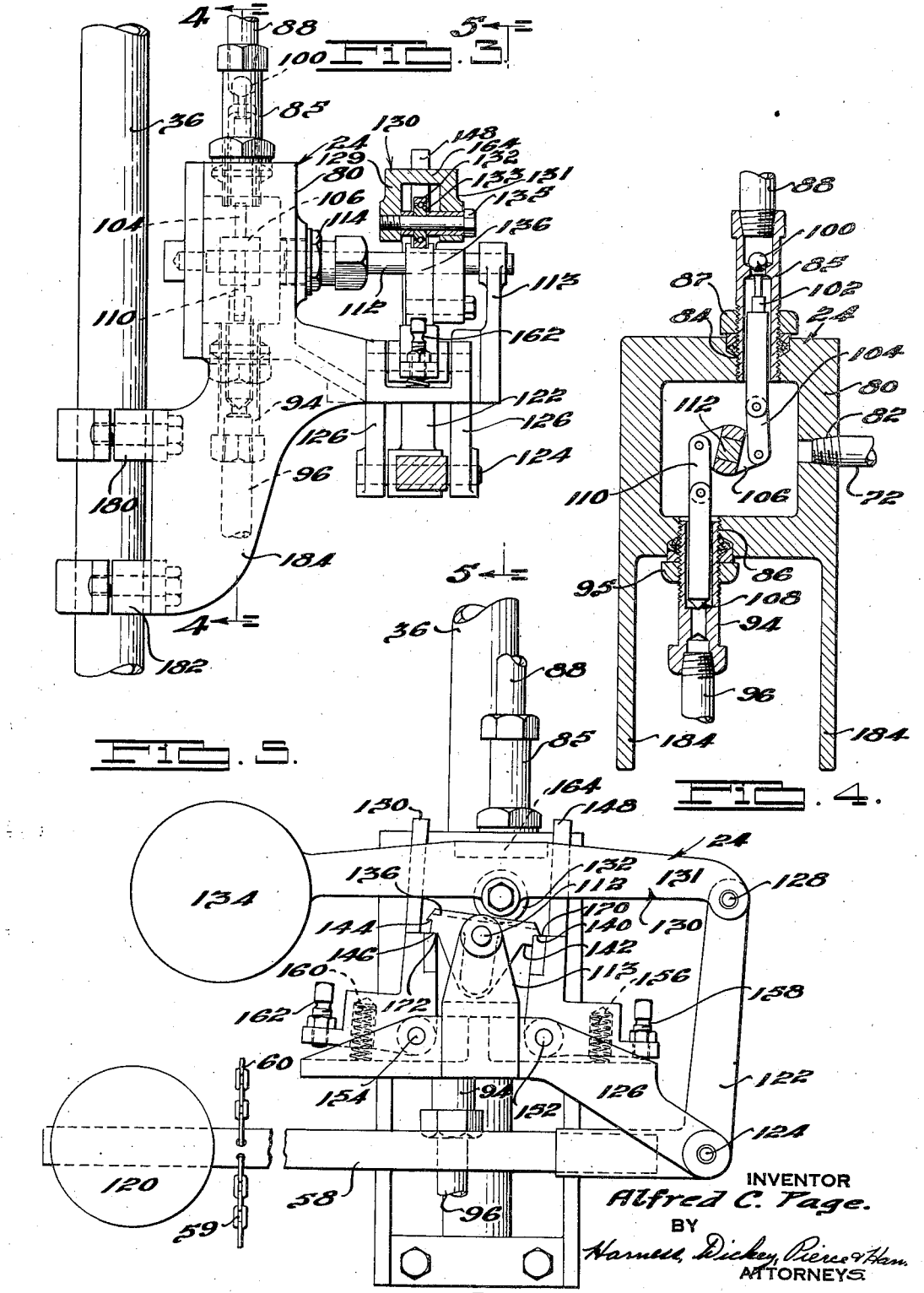
INVENTOR
Alfred C. Page.
BY
Harness, Dickey, Pierce & Ham.
ATTORNEYS March 5, 1940. A. C. PAGE 2,192,200
FLOW CONTROL AND METERING DEVICE
Original Filed Feb. 17, 1936 6 Sheets-Sheet 3
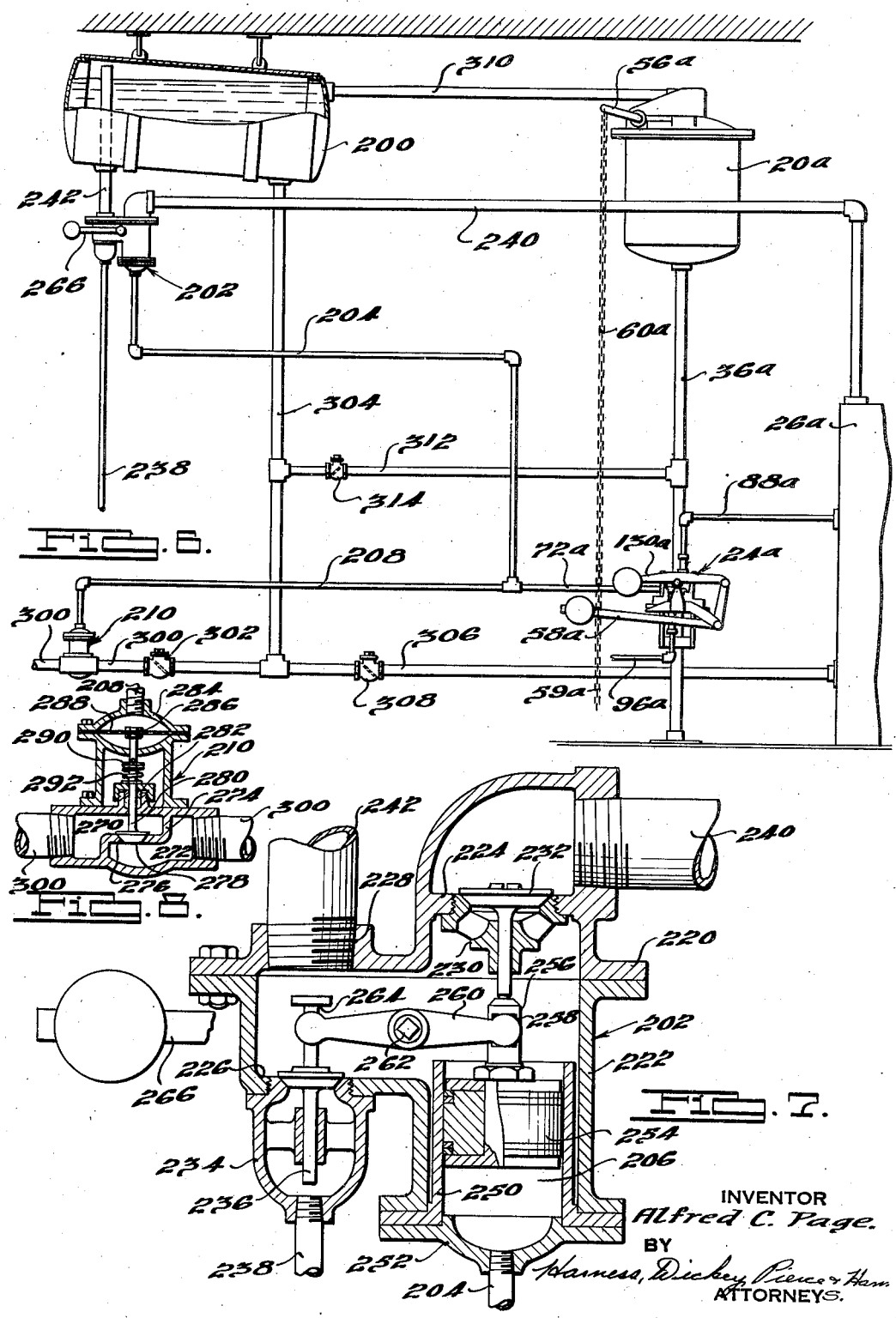
INVENTOR
Alfred C. Page.
BY
Harness, Dickey, Pierce & Ham
ATTORNEYS.

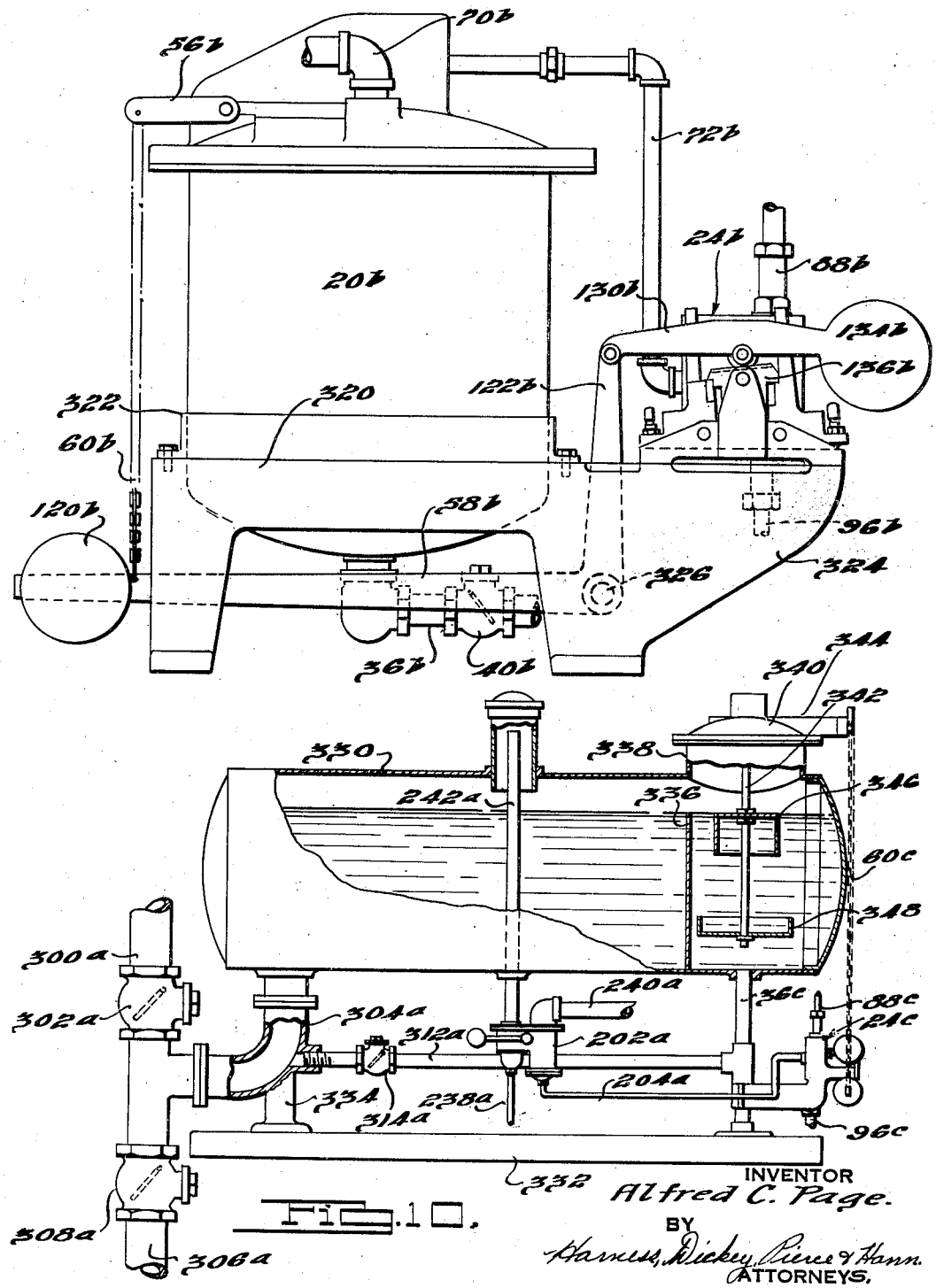

March 5, 1940.　　　　　A. C. PAGE　　　　　2,192,200
FLOW CONTROL AND METERING DEVICE
Original Filed Feb. 17, 1936　　　6 Sheets-Sheet 5
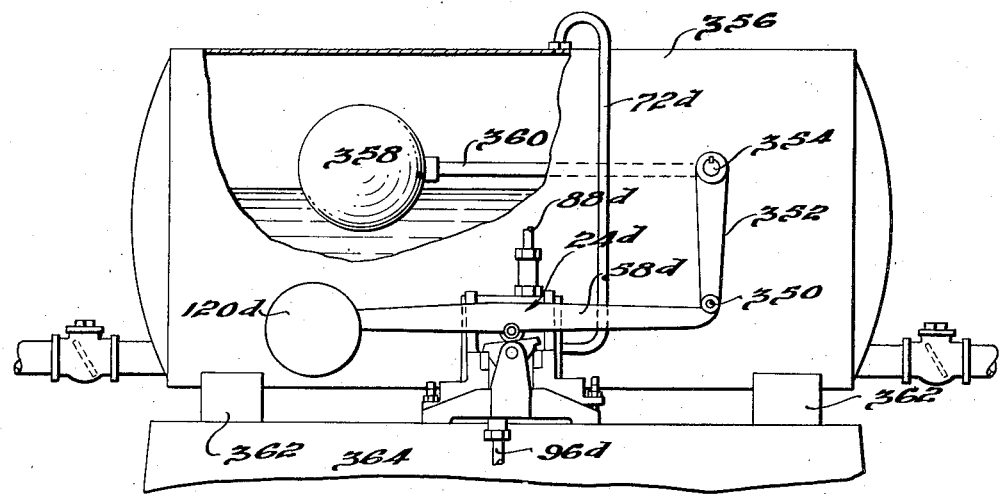
Fig. 11.
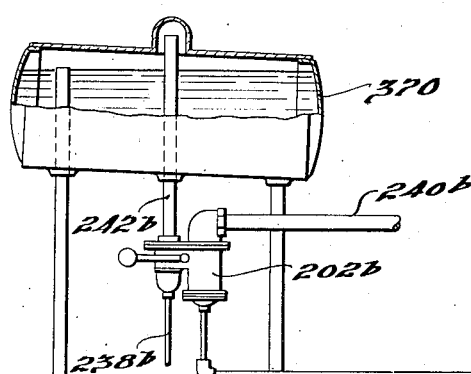
Fig. 12.
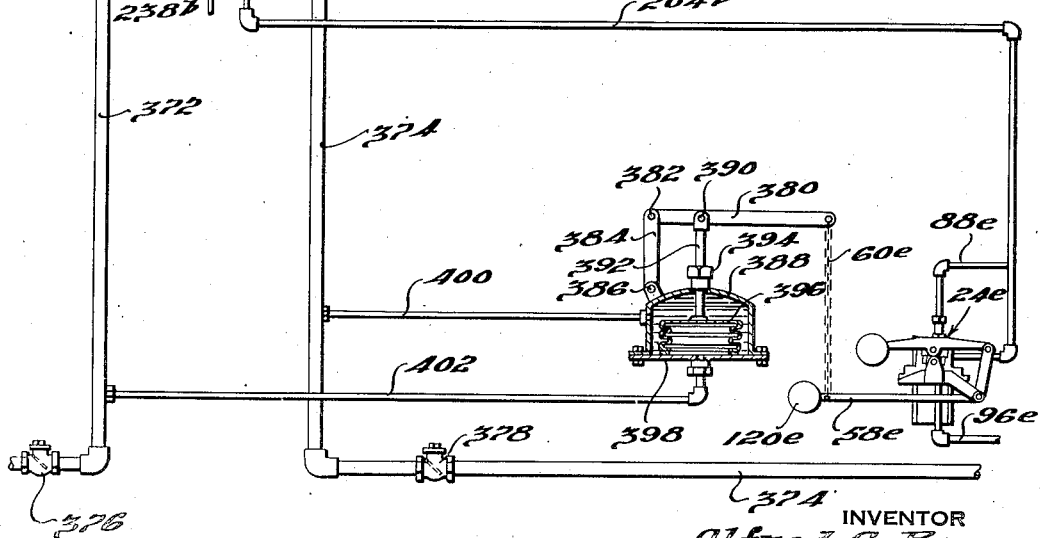
INVENTOR
Alfred C. Page.
BY
Harness, Dickey, Pierce & Hann
ATTORNEYS.

March 5, 1940. A. C. PAGE 2,192,200
FLOW CONTROL AND METERING DEVICE
Original Filed Feb. 17, 1936 6 Sheets-Sheet 6
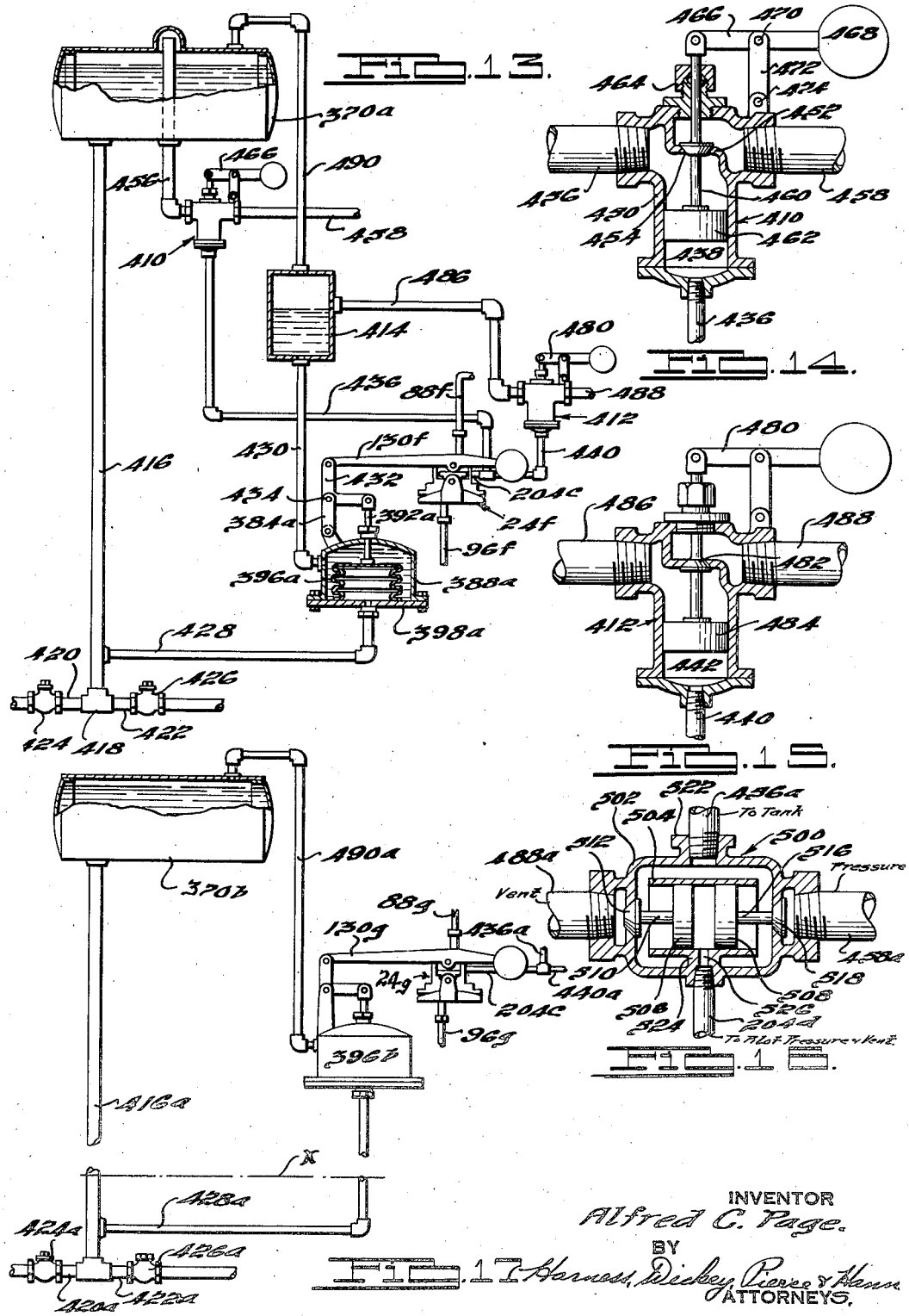
INVENTOR
Alfred C. Page.
BY
Harness, Dickey, Pierce & Hanss
ATTORNEYS.

Patented Mar. 5, 1940

2,192,200

UNITED STATES PATENT OFFICE 2,192,200

FLOW CONTROL AND METERING DEVICE

Alfred C. Page, Detroit, Mich., assignor to Christie Tufts Page, Detroit, Mich.

Application February 17, 1936, Serial No. 64,379
Renewed May 24, 1939

20 Claims. (Cl. 103—248)

The present invention relates to pumping apparatus, and in particular provides an improved apparatus whereby liquids may be automatically admitted to and forced from a closed tank by the application of steam, air or gas pressure to the liquid in the tank.

Objects of the present invention are to provide an improved apparatus for automatically pumping liquids, wherein the liquid is automatically admitted to and forced from a closed tank by the application of steam, air or gas pressure to the liquid in the tank; to provide such an apparatus capable of handling either large or small quantities of liquids and in which the essential working parts may be located in readily accessible position so that repairs and adjustments may be readily made; to provide such an apparatus adapted to handle the liquid being pumped without bringing the liquid into contact with the working parts of the apparatus; to provide apparatus capable of pumping liquid at high or low temperatures and under either low or high pressures, while permitting the working parts of the apparatus to be located in comparatively cool or otherwise remote positions; to provide an improved pumping apparatus as above generally stated, in which the pressure to be admitted to and vented from the tank may be derived either from the apparatus with which the liquid being pumped is associated or may be independently derived; and to provide such apparatus constructed to pump accurately predeterminable quantities of liquid in each cycle, and embodying means to meter or record the quantities.

Further objects of the present invention are to provide an improved pumping apparatus as above generally stated, embodying a closed tank provided with inlet and outlet check valves, means positioned either within or external to the tank for measuring the liquid level therein, and means responsive to the measuring device for controlling the admission to and venting of pressure from the tank, to correspondingly control the admission to and forcing from the tank the liquid being pumped; to provide such a device in which the measuring means is connected by mechanism external to the tank to a pilot valve which in turn controls the admission to and venting of pressure from the tank; to provide such a system in which the pilot valve mechanism is thrown to a venting position when the level of the liquid in the tank falls to a predetermined extent and is thrown to the pressure position when the level of the liquid in the tank rises to a predetermined height, but remains in the position to which it is last thrown during the intermediate travel of the measuring means; and to provide such a system embodying valve means for positively cutting off the tank supply in response to operation of the pilot valve.

Further objects of the present invention are to provide an improved pumping apparatus as above generally stated in which the pilot valve may control the admission to and venting from the closed tank of the pressure medium either directly or through relay valve mechanism; to provide such an apparatus in which the previously mentioned closed tank may either directly conduct all of the liquid being pumped, or may have associated therewith a supplementary tank through which the principal body of the liquid is conducted, means being provided to correlate the levels of the liquids in the two tanks; to provide such an apparatus in which the pumping and supplementary tanks may be positioned either adjacent each other or remotely from each other; the closed tank being filled by overflow from the supplementary tank; and to provide such an apparatus in which the valve mechanism associated with the pumping tank may either be positioned remotely therefrom or may be connected directly thereto to form an integrated or self-contained pumping unit.

Further objects of the present invention are to provide for use in a pumping system of the above stated character or the like, a pilot valve mechanism comprising a chamber having pressure and vent valves and actuating means therefor comprising a pivoted lever, latch means to hold the lever in either a venting or pressure position of the valve and means disposed to respond to the level of the liquid in a tank for releasing the latches and throwing the lever between the respective valve positions; to provide such a valve structure embodying a weighted arm reciprocable back and forth across a surface of the pivoted lever to positions on either side of the axis thereof, and embodying means adapted to respond to a varying liquid level for effecting the reciprocatory motion of the arm; and to provide a structure as just stated in which the movement of the arm is effected through a bell crank member connected to means directly and accurately responsive to a liquid level.

Further objects of the present invention are to provide a relay valve mechanism for use in a system of the above-described character or the like, embodying a piston valve, the chamber for which may be connected to pressure or vented and embodying pressure and vent valves responsive to the movement of the piston; to provide such a valve embodying a piston chamber connectible at one end to an external fluid pressure source, and opening at the other end to a pressure derived from the tank or other system being controlled by the valve; to provide such a valve embodying means to bias the valve to a predetermined position independently of the pressures existing therein; and to provide such a valve embodying means to effect the closure of the vent valve prior to the opening of the pressure valve, and, during an opposite movement of the valve to effect a closing of the pressure valve prior to the opening of the vent valve.

Further objects of the present invention are to provide an improved pumping apparatus as above generally stated in which, in accordance with various disclosed alternatives, the measuring element in the pumping tank may comprise a bucket suspended therein and connected through suitable link mechanism to the pilot valve mechanism; may comprise a float structure similarly connected to the valve mechanism; or may comprise a pair of related and oppositely directed buckets, one of which is disposed to entrap air and act as a closed float, the two buckets functioning to introduce a predetermined lost motion between the rise and fall of the liquid in the pumping tank and the movement of the pilot valve.

Further objects of the present invention are to provide a pumping system of the above generally stated type, in which the mechanism for controlling the admission and venting of pressure from the pumping tank may be located remotely therefrom; in which the measuring elements may be disposed to respond to the differential between a fixed load or force and the opposing static pressure head of the liquid in the tank; in which the measuring element may be disposed to respond to the differential between the static pressure on the supply and exhaust side of the pumping tank; and in which the measuring element may comprise a diaphragm or bellows element, suitably connected to pilot valve mechanism in turn adapted to control the admission to and venting of pressure from the pumping tank, either directly or through relay valves.

Further and more specific objects of the present invention appear in the following description and in the appended claims.

As set forth above, the invention may be characterized in a broad sense as providing a pumping system embodying means for automatically admitting liquid to and forcing it from a closed tank by the application of steam, air or gas pressure to the top of the liquid in this tank, means being provided, if desired, to automatically meter the amount of liquid passing through the apparatus. The steam, air or gas pressure, in the broader aspects of the present invention, may be derived either directly from the apparatus to which the liquid is applied, or may be derived independently thereof.

Illustrative applications of the present invention in systems in which the pressure medium is derived from the apparatus to which the liquid is applied, include the feeding and metering back to and into the boiler of condensate from steam heated apparatus, by the application to a closed tank of steam from the boiler. The apparatus may also be used for the pumping and the metering of absorbent oils from absorbers to stills, and from the stills to absorbers, in the extraction of gasoline from natural gas, the pressure of the gas being the motive force.

Illustrative applications of the present invention to systems in which the pressure medium is derived independently of the apparatus with which the liquid being pumped is directly associated, includes the pumping and metering of beverages such as milk and beer, which should not be stirred up or churned; the pumping of acids or corrosive liquids, pumping of sewage or other solid carrying liquids. In each of these instances, the pressure medium may be compressed air or other gas derived from a suitable external source.

A characteristic and important feature of the system is the accuracy of the metering action thereof, the pilot valve means being constructed to very sensitively respond to the levels of the liquid passing through the apparatus.

Having in view applications and objects such as those mentioned above, as well as others, preferred but illustrative embodiments of the present invention are shown in the accompanying drawings, throughout which corresponding reference characters are used to designate corresponding parts, and in which:

Fig. 1 is a view in elevation, with certain of the parts shown in section, of a boiler feed system embodying the present invention;

Fig. 1A is a fragmentary view illustrating the use in the system of Fig. 1 of a heat exchange device;

Fig. 2 is a fragmentary view in vertical section, taken along the line 2—2 of Fig. 1;

Fig. 3 is a fragmentary view, taken along the line 3—3 of Fig. 1, showing the pilot valve mechanism;

Fig. 4 is a fragmentary view in vertical section, taken along the line 4—4 of Fig. 3;

Fig. 5 is a view in elevation, taken along the line 5—5 of Fig. 3;

Fig. 6 is a diagrammatic view in elevation of a boiler feed system adapted for the handling of relatively large quantities of liquid, and embodying certain additional features of the present invention;

Fig. 7 is a view in vertical section of the relay valve mechanism shown generally in Fig. 6;

Fig. 8 is a view in vertical section of a cut-off valve preferably utilized in the system of Fig. 6;

Fig. 9 is a general view in elevation, illustrating a self-contained pumping unit embodying the present invention;

Fig. 10 is a general view in elevation, with certain parts broken away, illustrative of a modified construction of self-contained pumping units embodying the present invention;

Fig. 11 is a view in elevation, with certain parts broken away, illustrating a float operated system which may be used in the practice of the present invention; and Fig. 12 is a view in elevation with certain of the parts shown in section, of a modified embodiment of the present invention, utilizing a bellows or diaphragm operated element positioned remotely from the pumping tank.

Fig. 13 is a view in elevation, with certain of the parts shown in section, of a further modification of the present invention, utilizing a bellows or diaphragm operated element positioned remotely from the pumping tank;

Fig. 14 is a detail view, partly in section, of one of the valves preferably utilized in the system of Figure 13;

Fig. 15 is a detail view, partly in section, of another of the valves preferably used in the system of Figure 13;

Fig. 16 is a detail view, partly in section, of a valve structure which may be used to combine the functions of the two valves of Figure 14 and Figure 15; and Fig. 17 is a view in elevation of a further modified embodiment utilizing a diaphragm or bellows element.

In the embodiment shown in Fig. 1 and the accompanying detail Figures 2 through 5, the invention is embodied in a boiler feed system, and is utilized to feed condensate from a boiler back to and into the boiler, utilizing the boiler pressure as the pressure medium. The system shown in Fig. 1 comprises generally a closed pump tank 20, through which the liquid being pumped passes and which houses a level responsive bucket 22; a pilot valve designated generally as 24 and which very sensitively responds to the level of the bucket 22 within tank 20 to correspondingly control the admission to and venting of pressure from the tank 20; and suitable water and steam supply and vent lines connecting tank 20 with the illustrative boiler 26 to be fed by the improved pumping apparatus.

Tank 20 may be of conventional construction, embodying a body portion 30 and a cover 32 removably secured thereto by studs 34. A pipe 36 connected into the tank at the base thereof serves both to support tank 20 above the level of the associated boiler 26, and also to afford communication between the interior of the tank and a boiler supply line 38 which leads into boiler 26. Pipe 38 includes a conventional check valve 40 adapted, as will be understood, to prevent a flow of liquid from boiler 26 into line 38, but adapted to permit a reverse flow, that is, a flow from tank 20 through lines 36, 38 into the boiler 26.

The removable cover 32 of tank 20 is provided with a generally centrally positioned, upstanding housing portion 42 which provides bearings for a cross shaft 44 which extends between the opposite wells 46 and 48 of the housing 42, and also extends outwardly of the tank. The bucket 22 is suspended within tank 20 from shaft 44 by a link 50 secured at one end to shaft 44 and pivotally connected at the other end by a pin 52 to a rod 54, the lower end of which is secured to the base of bucket 22. A lever 56, suitably secured to shaft 44 for rotation therewith, is connected to the actuating lever 58 of pilot valve 24 by a suitable chain 60, so that lever 58 of valve 24 responds directly through chain 60, cranks 56 and 50 to the level within tank 20 of bucket 22.

The cover 32 of tank 20 is provided with a plurality of openings or passages 62, 64 and 66, into which the make up water line 68, the condensate return line 70 and the steam pressure line 72 are connected. The make up water line includes a conventional cut-off valve 74 and a check valve 76, adapted to permit flow in the direction indicated by the arrow but to prevent opposite flow. The condensate line 70 is provided with a corresponding check valve 78 adapted to permit flow in the direction indicated by the arrow but to prevent opposite flow.

The pilot valve 24 includes a chamber 80 having an outlet passage 82, an inlet passage 84, and a venting passage 86. A pipe 88 which may include a conventional strainer 90 and a cut-off 92 is connected into boiler 26 and into passage 82 through a valve 85 and stuffing box 87. The port 82 is connected by the previously mentioned pipe 72 to the tank 20. The venting passage is connected, through a valve 94 and stuffing box 95, to a vent line 96, which may include a conventional cut-off valve 98.

The valve 85 associated with the port 84 is provided with a ball 100, the ball being disposed to be moved off its seat by a plunger 102 connected by an intermediate link 104 to a crosshead 106. The nipple 94 associated with vent port 86 is provided with a needle valve 108 connected by an intermediate link 110 to the crosshead 106. Crosshead 106 is suitably secured upon a squared portion of a shaft 112, the left-hand end of which, as viewed in Fig. 3, is provided with a suitable bearing in the wall of chamber 80, and the right-hand end of which extends through the wall of chamber 80 for cooperation with the valve actuating mechanism. A stuffing box 114 is preferably provided to seal the joint between shaft 112 and housing 80.

The actuating mechanism for valve 24 comprises the previously mentioned lever 58 on the outer end of which a suitable counterweight 120 is adjustably secured, and which forms one arm of a bell crank, the other arm of which is designated 122. The bell crank comprising arms 58 and 122 is pivotally supported upon a shaft 124 which extends between brackets 126 which may be suitably secured to or form part of the valve structure. The upper end of the bell crank arm 122 is pivotally connected by a pin 128 to an arm 130, having two spaced legs 129 and 131, connected at one end by a counterweight 134 and at the other end by shaft 128. Intermediate the ends of arm 130, a web 164 extends between the two legs 129 and 131. A roller 132, provided with ball bearings 133, carried upon a shaft 135 extending between legs 129 and 131 rides in a groove upon the upper surface of a pivotally mounted lever 136.

The lever 136 is drivingly connected to the valve shaft 112 and provided with a pair of spaced shoulders 140 and 142 on the right-hand side thereof, as viewed in Fig. 4, and a corresponding pair of shoulders 144 and 146 on the left-hand side thereof. These pairs of shoulders cooperate respectively with latches 148 and 150, each of which is pivotally secured by a pin 152 and 154, respectively, to the valve structure. A coil spring 156 individual to latch 148 urges it in a counter-clockwise direction around its pivot pin 152 and an adjustable stop 158 limits motion thereof in a clockwise direction. A corresponding spring 160 individual to latch 150 urges it in a clockwise direction and an adjustable stop 162 therefor limits rotation in the opposite direction. The upper ends of each of the latches 148 and 150 are disposed in the path of web 164 of arm 130.

The lever 136 is shown in the various figures in the position in which it is effective to permit ball valve 100 to close the steam line 88, and to hold the needle valve 108 off its seat, thereby venting the valve to atmosphere and correspondingly venting tank 20 through the lines 72 and 96. Lever 136 is retained in this position pending the next operation of the valve by the engagement between the shoulder 140 thereof with a cooperating shoulder 170 formed in latch 148, and by the engagement of the shoulder 146 thereof with the cooperating shoulder 172 formed in latch 150.

As described hereinafter with reference to the operation of the system as a whole, the venting of the tank 20 is followed by a rising movement of bucket 22, and consequently a counter-clockwise rotation of the bell crank arms 58 and 122, which motion is transmitted to and causes a movement to the left of the cross arm 130, the roller 132 thereof rolling along the grooved surface of the lever 136. As this movement continues, the cam 164 on arm 130 engages the upper end of the latch 150, and rotates it in a counter-clockwise direction against the force of the associated compression spring 160. This rotation of latch 150 moves the shoulder 172 thereof out of supporting relation to the shoulder 146 of lever 136. This latter movement occurs after roller 132 has passed to the left (as viewed in Fig. 5) of the axis of rotation of lever 136, so that the weight of arm 130 and counterweight 134 now cause counter-clockwise rotation of lever 136. This rotation is interrupted when the shoulder 144 of lever 136 engages the supporting shoulder 172 of latch 150. This rotation of lever 136 also moves shoulder 142 thereof above the level of shoulder 170 of latch 148, permitting the latter to rotate in a counter-clockwise direction under the influence of compression spring 156 to a position in which shoulder 170 is in engagement with and in supporting relation to shoulder 142. In each of its two limiting positions, the lever 136 is thus firmly supported by the two latches 148 and 150.

The counter-clockwise rotation of lever 136 effects a corresponding counter-clockwise rotation of shaft 112, which, as viewed in Fig. 4, effects a closing movement of needle valve 108, and moves the ball valve 100 off its seat, admitting steam under the pressure of boiler 26 to the valve chamber, from which it is communicated to the tank 20 through the pipe 72.

The admission of pressure to tank 20, as just described, results in a fall of the level of the liquid therein and a corresponding fall of the position of bucket 22, as described in more detail hereinafter. The fall of bucket 22 results in a corresponding rise of the left-hand end of arm 58 and a corresponding movement to the right, as viewed in Figs. 1 and 5, of arm 130, the roller 132 during such movement rolling along the upper surface of the lever 136. At a point in the movement of arm 130, corresponding to the limit to the desired fall of the liquid in tank 20, web 164 of arm 130 engages and rotates latch 148 in a clockwise direction around its pivot pin 152, moving the shoulder 170 thereof out of supporting relation to lever 136 and permitting the latter to rotate in a clockwise direction under the weight of arm 130, which is now impressed thereon at a point to the right of the axis of lever 136, as viewed in Figs. 1 and 5. Lever 136 thus rotates to the position illustrated in Figs. 1 and 5 in which latch 148 supports shoulder 140 thereof and latch 150 supports shoulder 144 thereof. The clockwise rotation of lever 136 correspondingly rotates shaft 112, moving plunger 102 out of supporting relation to ball valve 100 and permitting the latter to close under the influence of the pressure within boiler 26, and drawing needle valve 108 to the open position, venting the valve and also venting tank 20 through pipe 72. It is noted that during the transfer of positions of valve 24, both the pressure and vent valves are open at the same time, this interval being negligible, however, since the mechanism acts very rapidly upon release of lever 136 by the latches.

It will be seen, therefore, that rise of liquid to a predetermined level in tank 20 results in actuating valve 24 to a position in which the vent port 86 is closed and the pressure port 84 is open, thus conducting steam under pressure from boiler 26 to tank 20, which pressure acts to lower the level of the liquid in tank 20. Similarly, when the level of the liquid in tank 20 falls to a predetermined point, valve 24 is actuated to open the vent ports, venting tank 20, and closing the pressure port, which results in a rise of the liquid in tank 20, as described hereinafter. The valves thus operate continuously between the venting and pressure positions, responding very sensitively to the liquid levels in tank 20.

Each cycle thus involves an up and a down movement of ball crank arm 58, and, to record the quantity of liquid pumped, suitable counting mechanism 61 may be connected for actuation by arm 58 through chain 59, or other connected means.

It will be evident from the foregoing description that valve 24 and its operating mechanism, as just described, may be positioned at any suitable or desirable point remote from the boiler 26 and also remote from the associated tank 20, the respective connections between these elements being such as to readily accommodate such remote locations. It will also be apparent that tank 20 may be located at any desirable point remote from boiler 26, the only requirement in the present instance being that the level of tank 20 shall be above that of boiler 26, since the pressure within boiler 26 acts through line 88 to feed liquid into the boiler, and acts through check valve 40 to oppose such admission. Gravity is thus relied upon in the illustrated construction to effect the actual feeding of the liquid from tank 20 to the boiler. In the illustrated arrangement, valve 24 and its associated operating mechanism is supported upon the previously mentioned pipe 36, through brackets 180 and 182, which may either be formed integrally with or suitably secured to the downwardly extending legs 184 associated with the valve housing.

Considering now the operation of the above described embodiment as a whole, it will be understood that the steam output of boiler 26, after being circulated through the associated system (not shown) may be returned to the boiler by way of the line 70, suitable pumping apparatus (not shown) being utilized to supply liquid under suitable head to the line 70. The check valve 78 acts to permit a flow through line 70 when the pressure on the right-hand side thereof as viewed in Fig. 1 is less than that on the left-hand side thereof, or stated in another way, to permit such flow when tank 20 is vented through valve 24. At this time, check valve 40 is closed under the influence of the pressure existing within boiler 26, thus preventing a flow from boiler 26 through pipes 38 and 36 into tank 20.

The liquid thus admitted to tank 20 by way of the condensate return line 70, or through the make-up line 68, enters tank 20 through the passages 64 and 62 respectively, which passages are positioned above bucket 22, and ultimately fills bucket 22 and overflows therefrom into the tank space around buckets 22. As the level of the liquid in tank 20 rises around bucket 22 the buoyancy thereof increases or stated in another way, the effective weight thereof decreases, permitting arm 58 and counterweight 120 to rotate in a counterclockwise direction as viewed in the figures, moving arm 130 of valve 24 to the left as viewed in Figs. 1 and 5.

When the level in tank 20 reaches a predetermined height, determined by suitable adjustment of the parts, and to which level arm 130 is sensitively responsive, the accompanying movement of arm 130 trips lever 136 as previously described, closing off the vent port of valve 24 and opening the pressure port thereof, thus connecting boiler 26 to tank 20 by way of the line 88, valve 24 and line 72. As the pressure thus admitted to tank 20 builds up, it forces check valve 78 to the closed position, and, acting through the liquid within tank 20, pipes 36 and 38, counterbalance the boiler pressure heretofore acting to maintain the check valve 40 in closed position. Tank 20 being positioned above boiler 26, a gravity differential now exists, which forces check valve 40 to the open position, permitting the liquid in tank 20 to initiate a feed into boiler 26.

As this feed continues, and the level of the liquid in tank 20 correspondingly falls, the now full bucket 22 moves downwardly at a rate proportional to the fall of the liquid in tank 20, and results in a corresponding upward movement of chain 60 and consequently of the arm 58 of valve 24. When the level on the liquid in tank 20 has fallen to the predetermined limit value thereof, determined by the relative adjustment of the operating parts of the system, the just described movement of arm 58 of valve 24 actuates the latter in the previously described manner to close the steam port and to open the vent port, thus venting the space above the liquid in tank 20. This venting action relieves the pressure on check valve 78, which correspondingly opens under the influence of the pressure in the supply line, and also permits check valve 40 to close under the influence of the boiler pressure. The flow through tank 20 continues, accordingly, only during the time that valve 24 is in the pressure position, that is the position in which the vent port is closed and the pressure port is opened. As previously stated, valve 24 occupies the pressure position only while the level of the liquid in tank 20 is between the upper and lower limit values thereof, being moved to the pressure position when the level reaches a certain upper value and being moved to the vent position when the pressure reaches the predetermined lower value. Each actuation of the valve 24, therefore, occurs after a predetermined quantity of liquid has passed into the tank 20, the action thereof being independent of the rate at which the liquid passes through the tank, as well as being substantially independent of the temperature of the liquid.

The system thus operates continuously to feed successive metered and definite quantities of liquid to the boiler 26, the number of operations of valve 24 being an accurate measure of such quantities and being transmitted through the previously mentioned chain 59 to suitable counting mechanism 61.

It will be understood that, in certain instances, the temperature of the contents of the return line 70, which are maintained in liquid form by the pressure in that line, may be sufficiently high that, when discharged into the vented tank 20, a substantial quantity of the liquid vaporizes and develops an appreciable steam pressure in tank 20. The pressure in line 70 may be expected to be high enough so that the back pressure thus developed does not seriously interfere with the flow through line 70. In many instances, however, the pressure in the make-up water line 68 may be so low that the back pressure developed, as just stated, does noticeably interfere with the flow through line 68.

To overcome any tendency of the return condensate from producing this interference, the present invention provides for the use of means to suitably lower the temperature of the return condensate before it is admitted to tank 20. As illustrated, a heat exchange unit is interposed in the system, the relatively low temperature liquid in the make-up water line being utilized as the cooling agent.

Referring to Fig. 1A, the coil 194 of a heat exchange unit 190 is connected into the return condensate line 70. The enclosing tank 192 of the unit is connected into the make-up water line 68. With this arrangement, it will be understood that the liquid circulated through the coil 194 is subjected to the cooling influence of the relatively cool liquid circulated through the tank 192 from the line 68. The temperature of the liquid in the return line 70, when admitted to tank 20, accordingly, is sufficiently low to prevent the generation of an objectionable steam pressure within tank 20. In all other respects, as regards structure and operation, the embodiment of Fig. 1A may be as described above.

Considering now the embodiment of the present invention shown in Figs. 6, 7 and 8, the system is particularly adapted to handle liquids in large quantities, and includes a tank 20a corresponding in all respects, except those noted below, to the previously described tank 20; a pilot valve 24a corresponding in all respects to the previously described valve 24; a supplemental tank 200 and a relay valve 202. Valve 24a responds, through chain 60a, to the level of the liquid in tank 20a, and is connected into boiler 26a through a line 88a and to atmosphere through a vent line 96a, all in the previously described manner.

The line 72a, which corresponds to the line 72 in the previously described embodiment, is branched, the branch 204 thereof being connected into the piston chamber 206 of the just mentioned relay valve 202 and the branch 208 thereof being connected into a diaphragm operated cut-off valve 210.

The relay valve 202, shown in more detail in Fig. 7, comprises generally casing members 220 and 222 forming between them a valve chamber having a pressure port 224 and a vent port 226, and an outlet port 228. A conventional seal and guide 230 for a poppet type pressure valve 232 is threaded into the pressure port 224, and a nipple 234, forming a seat and guide for a corresponding poppet valve 236, is threaded into the vent port 226. The line 238 threaded into the nipple 234 vents to atmosphere. The pressure supply line 240 threaded into the casing member 220, in communication with the valve chamber space above valve 232, is connected into the boiler 26a. The line 242 threaded into the outlet passage 228 extends into the tank 200, to a point above the normal level of the liquid therein.

The casing portion 222 is formed to provide a tubular passage within which a cylinder 250 is secured. The upper end of cylinder 250 opens into the chamber space between valves 236 and 232, and the lower end thereof is closed by a bonnet 252 into which the previously mentioned line 204 is threaded. Piston 254, slidably received in cylinder 250, is provided with a piston rod 256, the upper end of which is disposed to engage the lower end of valve 232 and force the latter to an open position in response to upward movement of the piston as viewed in Fig. 7. Piston rod 256 is provided with a notch 258, to receive one end of a lever 260, pivotally supported in the casing upon a squared shaft 262. The other end of lever 260 is disposed to engage the underside of the head 264 of vent valve 236. The squared shaft 262 extends outwardly of the valve casing, and supports a counterweight lever 266, which acts continuously to urge lever 260 in a counter-clockwise direction, as viewed in Fig. 7, and consequently to move piston 254 upwardly and to move valve 232 to the open position.

The cut-off valve 210 shown in detail in Fig. 8, may be of conventional construction, comprising a casing formed to provide chambers 270 and 272, separated by a web 274. A passage 276 through web 274 is adapted to be opened and closed by a valve 278, the rod 280 of which extends outwardly of the casing through a suitable stuffing box 282 and into a diaphragm casing 284, the end thereof being secured by nuts 286 to a suitable flexible diaphragm 288. A compression spring 292 seated between a collar 290, suitably secured upon rod 280 and the upper side of the stuffing box 282, urges rod 280 upwardly and consequently urges valve 278 to the open position as viewed in Fig. 8. The force applied by spring 292 exceeds the resistance to flexing of diaphragm 288, so that valve 278 normally occupies an open position, permitting free flow of liquid through the line 300 to the check valve 302. Upon the application of pressure to the upper side of diaphragm 288, through line 208, as controlled by the pilot valve 24a, diaphragm 288 is forced downwardly against the force of spring 292 and moves valve 278 to the closed position, positively shutting off the flow of liquid through the line 300 and isolating the pumping system from the source of supply. The purpose of this valve is moved in the description of the operation as a whole.

The supplementary tank 200 is connected to the intake line 300 through the check valve 302 disposed to permit flow under pressure through line 300 into the pumping system, but to prevent flow in a reverse direction, and through a pipe 304, connected into line 300 and also connected into the base of tank 200. Tank 200 communicates with boiler 26a through the pipe 304 and a pipe 306 in which is interposed a conventional check valve 308, adapted to permit flow into the boiler through line 306 but to prevent reverse flow.

The tanks 200 and 20a are interconnected by a line 310 which is connected into tank 20a in the manner described with reference to the intake line 70 of Fig. 1, and is connected into tank 200 at a level corresponding to substantially the maximum height the liquid is intended to rise in tank 200. During operation, accordingly, when the liquid in tank 200 rises to the predetermined value, liquid overflows through line 310 into tank 20a, and results in the operation of the pumping system as previously described. The liquid thus transferred to tank 20a is discharged therefrom in the course of the pumping action, through a line 312 which interconnects the previously mentioned pipes 36a and 304, and which includes a conventional check valve 314 adapted to permit flow from pipe 312 into pipe 304 but to prevent a reverse flow.

As in the previously described embodiments, the tanks 20a and 200 are disposed above the level of the boiler 26a, since the embodiment now being described is designed to utilize the pressure within boiler 26a to actuate the pumping mechanism. Except for this limitation, it will be understood that tanks 20a and 200 may be located in any desired location remote from or adjacent to boiler 26a, and also may be located either remotely from or adjacent to each other.

Considering now the operation of the system as a whole, pilot valve 24a is shown, as described with reference to the first embodiment, in the venting position, that is, the steam line 88a to boiler 26a is closed off by the pressure valve and the vent line 96a is opened. The space beneath piston 254 of relay valve 202 is therefore vented to atmosphere through pipes 204, 72a and 96a and the space above the diaphragm of cutoff valve 210 is similarly vented. The pressure valve 232 of relay valve 202 is thus closed under the pressure from boiler 26a in line 240. The vent valve 236 of relay valve 202 is also closed at the time, being urged to this position by gravity, and the lever 260 being held spaced from the operating head 264 thereof by the counter weight lever 266, it is noted that the weight of lever 266 is insufficient to overcome the pressure in line 240, which is acting, as stated, to hold valve 232 in the closed position.

The pressure in the return condensate line 300, derived from any suitable external source (not shown), is thus effective to force liquid through the now open cutoff valve 210, through check valve 302, and into tank 200 by way of pipe 304, check valve 308 being held closed by the superior back pressure imposed thereon from boiler 26a.

As the liquid thus directed into the tank 200 rises therein, the pressure there within may rise somewhat, the only effect of such increase in pressure being to impose a downward force upon piston 254 of relay valve 202, resulting in a downward movement thereof which may open the vent valve 236, thus venting the space above the liquid in tank 200 by way of pipes 242 and 238, without interrupting or interfering with the filling of tank 200.

When the level of the liquid in tank 200 reaches the level of the connecting pipe 310, the liquid overflows therethrough into the tank 20a, relatively rapidly filling the latter tank. As described in connection with the first embodiment, the rise of the liquid in tank 20a is accompanied by a corresponding downward movement of the actuating lever 58a of pilot valve 24a and a corresponding movement to the left, as viewed in Fig. 6, of the arm 130a. When the liquid reaches a predetermined level in tank 20a, or when travel of arm 130a reaches a selected limit, pilot valve 24a is actuated to open the associated pressure valve and close off the associated vent valve, this action resulting in supplying steam under pressure from boiler 26a to the under side of piston 254 of relay valve 202 by way of line 88a, pilot valve 24a, and lines 72a and 204. Pressure is also simultaneously applied to the upper side of the diaphragm associated with cutoff valve 210 by way of line 208. The consequent operation of valve 210 cuts off the flow of liquid through the return line 300 and interrupts the rise of liquid in the tank 200.

The application of pressure to the underside of piston 254 of relay valve 202 causes the latter to move upwardly, rotating lever 260 in a counter clockwise direction, as viewed in Fig. 7. During this rotation of lever 260, the left hand end thereof first moves away from the under side of the head 264 of vent valve 236, permitting the latter to close, and thereafter, the upper end of piston rod 256 engages the under side of valve 232. Further movement of said piston forces valve 232 to the open position, admitting pressure from boiler 26a to valve 202 through the line 240, and communicating such pressure to the space above the level of the liquid in tank 200 by way of line 242.

The pressure thus admitted to tank 200, counterbalances the pressure within boiler 26a, which is acting to hold check valve 308 in closed position, and permits a gravity discharge of the liquid in tank 200 through pipes 304 and 306 into boiler 26a. The pressure in tank 200 is also communicated to tank 20a by way of line 310, so that the fall of the liquid in tank 200 is accompanied by a corresponding fall of liquid in tank 20a, the relative sizes of the discharge pipes 304, 36a and 312, being such that the falls of the liquid in the two tanks occur at substantially the same rate.

The throw of pilot valve 24a to the vent position, resulting as described in the first embodiment, from the fall of the liquid in tank 20a to the predetermined power limit, cuts off the flow of steam from boiler 26a through pipe 88a and vents the space beneath piston 254 of relay valve 202 through lines 204, 72a and 96a, the space above the diaphragm in cutoff valve 210 being correspondingly vented through pipe 208.

It will be noted that during the course of the pumping action, the pressures on piston 254 are equalized, and the pressures on the pressure valve 232 are correspondingly equalized, since the pressure in lines 240 and 204 are equal, both being derived from boiler 26a. So far as pressures are concerned, accordingly, valve 232 is in a balanced position. As previously stated, however, the counter weight arm 266 acts in a direction to open valve 232, and thus maintains the latter in the open position during the pumping action.

In response to the venting of the pressure on the diaphragm of cutoff valve 210, this valve moves to the open position under the influence of the compression spring 290, associated therewith, thus permitting a flow of liquid from the return line 300 into the pumping system. Similarly, the venting of the pressure from the under side of piston 254 of the relay valve 202 renders the pressure in line 240, derived from the boiler, and in line 242, derived from tank 200, effective to force valve 232 in closed position, closing off line 240 and isolating valve 202 from the boiler. The pressure in line 242 persists, however, causing piston 254 to continue a downward movement, ultimately bringing the end of lever 266 into engagement with the head 264 of valve 236, moving the latter to an open or venting position, venting the pressure stored in tanks 20a and 200. After this venting action is complete, it may be expected that vent valve 236 will move to a closed position under the influence of gravity, thus restoring all of the parts to the positions occupied thereby at the beginning of the described cycle, and initiating a flow of liquid into tank 200 from the return line 300. It will be noted that the release of the pressure from tank 200 permits valve 308 to be closed by the back pressure from the boiler 26a.

As previously stated, the use of the pumping and supplemental tank 20a and 200, of individual construction, is of advantage first since it permits the various elements of the pumping system to be located either remotely from or adjacent to each other, depending upon the condition of the installation, and also because the relatively large supplementary tank may be constructed with capacity to handle much larger quantities of liquid than it may be desirable to transmit through the pump tank 20a. A further and important advantage, resulting from the use of the separate tank, resides in the resulting improved metering action of the system.

It will be noted that the liquid supplied to the system through the return line fills the large tank 200 to substantially the maximum level therein before any liquid is transmitted to the smaller tank 20a. Because of the difference in sizes of the two tanks, tank 20a fills at a relatively rapid rate, after the level of the liquid in tank 200 reaches the connecting pipe 310, and any change in the level of the liquid in tank 200, occurring during the filling of tank 20, is of negligible value. Accordingly, even an appreciable variation in the level of liquid in tank 20a at which valve 24a operates, is accompanied by only a negligible variation in level of the liquid in tank 200. Concerning the cut-off point of the system, it will be noted that the base of tank 20a is positioned somewhat below the base of tank 200, so that when the liquid in tank 20a has fallen to the cutoff value thereof, all of the liquid from tank 200 has been drained therefrom and the liquid stands in pipe 304 at a level below the base of tank 200. This relationship improves the accuracy of the metering action of the present system, since any variation in the level of the liquid in tank 20a at the time of the cutoff, while representing a corresponding variation in height of the liquid in pipe 304, introduces only a very small variation in the quantity of liquid pumped in any one cycle because the reduced diameter of pipe 304. It will be seen, therefore, that the quantities of liquid pumped during each cycle are substantially constant.

In certain instances, such as in connection with the pumping of liquids at high temperatures, as where the return condensate is of a relatively high temperature, it is found satisfactory to eliminate the cut off valve 210 and to utilize the check valve 302 to control the line 300. In certain other instances, as where the temperature of the liquid being supplied to the tank by way of pipe 300 is of a relatively low value, the cut off valve 210 is found to be particularly advantageous. In cases where a relatively cold liquid is being supplied to tank 200, the initial admission of the steam pressure thereto, upon operation of pilot valve 24a, may not immediately result in closing of the check valve 302, since a substantial amount of the steam thus supplied to tank 200 may be absorbed by the relatively cold liquid, thus delaying the rise of the pressure in tank 200 to a value sufficient to close off check valve 302. By providing the positive cut-off valve 210, however, which operates simultaneously with the introduction of steam pressure to tank 200, the flow through pipe 300 is positively interrupted, and any effects of absorption of the steam are eliminated.

The cut-off valve 210 is also advantageous in high pressure systems, and in systems where extreme metering accuracy is required, since it provides a positive cut-off to the entry of liquid into the closed tank.

Where the system is embodied in a boiler feed, as described, the back pressure of the boiler acts to promptly close the outlet check valve upon movement of the pilot valve to the venting positions. In other instances, as where the liquid is transmitted to a low pressure point, it is desirable to load the outlet check valve artificially, as by a spring or the equivalent expedient common in relief valve constructions, to thereby cause it to promptly close upon venting of the pressure from the closed tank.

In Fig. 9, certain aspects of the present invention are embodied in what may be called a self-contained unit, applicable either for use in a boiler feed system, as described with reference to Figs. 1 through 5, or with reference to the pumping of other liquids in installations such as those mentioned at the beginning of the present specification, in which the actuating pressure for the pumping system may be derived from independent sources and may be either steam, air, gas, or the like.

In Fig. 9 the pump tank 20b and the pilot valve 24b are supported in adjacent relation upon a base 320, which is provided with a substantially circular neck 322, to accommodate tank 20b, and an offset bracket portion 324, which accommodates the pilot valve 24b. Bracket 324 also provides suitable bearings for the shaft 326 which supports the bell crank having the arms 122b and 58b.

The intake line 70b, which leads into tank 20b, may communicate with any suitable source of liquid, and the outlet line 36b, in which the check valve 40b is interposed, may lead to any suitable source to which the liquid is to be directed. As indicated by the reference character subscripts, the elements of the system of Fig. 9 correspond in all respects, except those stated, to the elements of the embodiment shown in Figs. 1 through 5, and the operation thereof is the same as described in detail with reference to Figs. 1 through 5. Further description of the embodiment shown in Fig. 9 is therefore thought to be unnecessary.

Fig. 10 illustrates an embodiment of certain aspects of the present invention in a self-contained unit, arranged to have an operating cycle substantially the same as that described with reference to Figs. 6, 7, and 8, and embodying, except as noted below, the same structural features and arrangement of parts.

In Fig. 10, the tank 330, suitably supported upon a base 332 by standards 334, is divided into two separate tanks by a partition 336 for the same reasons described with reference to Figs. 6, 7, and 8, the present construction being advantageous in that a single outer tank structure is employed.

The right hand end of tank 330, as viewed in Fig. 10, is provided with an upstanding circular flange 338, which supports the cover 340, which corresponds in all respects to the cover 32 described with reference to Figs. 1 through 5, in so far as it provides a bearing for a cross shaft adapted to support the rod 342, which cross shaft also externally supports the lever 344, to which the operating chain 60c is connected.

In the present instance, the rod 342 supports two buckets 346 and 348, positioned in spaced and oppositely directed relation thereon, the bucket 348 being positioned with its base lowermost, and the bucket 346 being positioned with its base uppermost. The two buckets, positioned relative to each other in this manner, are advantageous in that a certain lost motion is introduced between the travel of chain 60c and consequently the travel of the operating members of pilot valve 24c, and the rise and fall of the liquid in tank 330.

In operation, when the level of the liquid in tank 330 falls below the level of the base of the lower bucket 348, the chain 60c is subjected to an upward force equal to the combined weight of the two buckets, plus the weight of the liquid previously deposited in bucket 348. As the liquid rises in tank 330, the lower bucket 348 first becomes buoyant, reducing the effective lifting weight on chain 60c, which buoyant effect remains substantially constant from the time the level of the liquid passes the upper edge of bucket 348, until it reaches the underside of bucket 346 and thereby entraps air in the latter. Following the latter action, further rise of the liquid in tank 330 imparts a buoyant effect to bucket 346, again reducing the lifting weight on chain 60c. The same sequence results during fall of the liquid in tank 330, the initial fall of the liquid increasing the lifting weight on chain 60c as the buoyant effect on bucket 346 is reduced, maintaining constant the lifting weight on chain 60c during the period that the liquid is falling from the under-edge of bucket 346 and until it reaches the upper edge of bucket 348. After the latter point, further fall of the liquid results in a further increase of the lifting weight on chain 60c. During both the rise and fall of the liquid in the tank, therefore, it will be seen that there is an intermediate period in which the lifting weight on chain 60c remains substantially constant, so that a lost motion is introduced between the movement of chain 60c and the rise and fall of the liquid in the tanks. This lost motion is of advantage in that it permits use of a valve 24c constructed to accommodate only a limited travel to correspond to a rather substantial travel of the liquid levels.

In all other respects, as indicated by the reference character subscripts in Fig. 10 the operation of the embodiment of Fig. 10 is as described in detail with reference to Figs. 6, 7 and 8, it being noted that the line 300a may be connected to a suitable external source of supply, and the line 306a may be connected to a suitable point to which the liquid is to be directed. Similarly, the pressure line 88c and 240a may be connected to any suitable source of steam, air, gas or like pressure. It is considered therefore, that further description of the embodiment of Fig. 10 is unnecessary.

Referring to Fig. 11, an embodiment of the present invention is illustrated in which the pilot valve is connected for operation by a float, disposed within the pump tank. In Fig. 11, the arm 58d of the pilot valve 24d is pivotally connected by a pin 350 to the lower end of a crank 352 suitably keyed to a shaft 354. Shaft 354 extends into the tank 356, and is there connected to and disposed for actuation by float 358 carried on the end of a rod 360. As will be evident, the rise and fall of float 358 which occur in accordance with the level of the liquid in tank 356, are transmitted to crank 352 and cause cross-arm 58d to move back and forth with respect to the cooperating valve elements. As in the previously described embodiments the connections between floats 358 and cross-arm 58d are such that a rise of the float is accompanied by movement of arm 58d in a direction to ultimately actuate valve 24d to the pressure position, and a fall of the level of float 358 results in travel of arm 58d in a direction to cause ultimately a venting movement of valve 24d.

The parts are illustrated in Fig. 11 in self-contained relation, tank 356 being disposed upon standards 362 and supported upon a bed plate 364 which also forms a stationary support for the pilot valve structure.

Fig. 12 illustrates an embodiment of the present invention in a system in which the application of pressure to and the venting of pressure from a pump tank are controlled by means of a diaphragm or bellows operated mechanism, which may be located at any desirable elevation relative to the pump tank, and in any desired position remote from or adjacent thereto.

In Fig. 12 a tank 370 is provided with an intake pipe 372 which extends thereinto to the level to which the liquid therein is expected to rise; and an outlet pipe 374 connected into the base of the tank 370 and extending to the apparatus (not shown) with which the pumping system is associated. A check valve 376 is interposed in the line 372, and is disposed to permit a flow through pipe 372 into tank 370 but to prevent an opposite flow. A corresponding check valve 378 is interposed in line 374, and is effective to permit a flow from the tank through pipe 374 but to prevent a reverse flow. Where the system now being described is utilized in connection with a boiler feed, it will be understood that pipe 372 may be connected to the condensate return line and that pipe 374 may be connected into the boiler.

Preferably and as illustrated the system includes a pilot valve 24e corresponding in all respects to the previously described pilot valve 24 and a relay valve 202b corresponding in all respects to the previously described relay valve 202, which valves are interconnected by a steam line 204b and are provided respectively with vent lines 96e and 238b and steam lines 88e and 240b. Valve 202b is provided with an outlet line 242b, which leads into the tank 370 and extends to a point therein above the maximum liquid level.

The actuating lever 58e of valve 24e, carrying the counterweight 120e, is connected by a chain 60e to a lever 380, which is pivotally connected by pin 382 to a link 384 which in turn is pivotally connected to a bracket 386 secured to the casing 388 of a diaphragm or bellows operated mechanism. Intermediate its ends, lever 380 is pivoted by pin 390 to the piston rod 392 which extends through a suitable stuffing box 394 into the casing 388 and is connected at its end to the bellows or diaphragm 396, the lower marginal edge of which is suitably sealed to the base 398 of the unit. A line 400 connects pipe 374 into the casing 388 externally of the bellows 396. A similar pipe 402 connects pipe 372 with the interior of the bellows or diaphragm 396. The exterior and interior of the member 396 are thus subjected to pressures proportional to the static pressures existing at any time in pipes 372 and 374. In the present instance, it is assumed that the external pressure applied to line 372 is constant, so that it will be seen that the interior of element 396 is subjected to a substantially constant head or load, one component of which is the static head of the liquid in the tank.

Considering the operation of the system as a whole, valve 24e is shown in the venting position, in which position, as previously described, line 204b is vented through line 96e and consequently line 242b, leading into the tank 370, is vented through line 238b. With the parts in this condition, check valve 378 is closed under the influence of the back pressure existing in the line 374 to the right thereof and check valve 376 is opened under the influence of the return pressure existing to the left thereof. Liquid thus flows into tank 370 through pipe 372 and drains into pipe 374 in which it accumulates. Until the level of the liquid in tank 370 has risen to the level of the top of the pipe 372 therein, the static pressure in line 372 exceeds the static pressure in line 374 so that consequently the underside of member 396 is subjected to a greater pressure than the exterior thereof. The differential between the two static pressures, however, decreases progressively as the liquid in tank 370 rises and in response to the decreasing differential, the member 396 gradually collapses, under the influence of the weight on chain 60e. When the static pressures become equal, the valve 24e operates, supplying pressure to relay valve 202b through line 204b, which valve, through line 240b and 242b admits pressure to the space in tank 370 above the level of the liquid. The pressure thus introduced causes check valve 376 to close and check valve 378 to open, either because the pressure within tank 370 is superior to the back pressure in line 374, or where such pressures are equal as in a boiler feed system such as described above, because tank 370 is above the level of the boiler. Accordingly, the liquid within tank 370 starts to discharge therefrom through pipe 374. As this action continues, although the static head in pipe 372 remains substantially constant, the static head in pipe 374 progressively decreases, thus expanding element 396 and ultimately causing valve 24e to again operate, venting the space above the liquid in tank 370. Preferably the adjustment of the parts is such that the differential pressures reach the operating value only after the liquid has drained completely from tank 370 and stands at a predetermined point within pipe 374. With this arrangement, although the rise and fall of the liquid in pipe 374 represents a substantial change in the relation between the static pressures in pipes 400 and 402, any differences in level in pipe 374 at which valve 24e operates make only negligible differences in the total quantity of liquid pumped in successive cycles.

Considering now the embodiment shown in Figure 13, and in the accompanying detail views, Figures 14 and 15, the arrangement, in a broad sense, distinguishes from that of Figure 12 in that the force supplied to the diaphragm or bellows by the static head pressure of the liquid in the closed tank is opposed by a substantially constant force which is independent of the static pressure on the inlet side of the system and thus is unaffected by any variations which may occur in such inlet static pressure.

The system comprises generally a tank 370a to and from which the pressure is to be selectively admitted and vented; a diaphragm operated element and a pilot valve corresponding in all respects with those described with reference to Figure 12 except as hereinafter noted; a relay valve 410; a vent valve 412 and what may for convenience be called a surge tank 414.

The liquid admitted to and forced from tank 370a passes through a pipe 416 connected into the base thereof, and also connected by a T-fitting 418 to an inlet line 420 and an outlet line 422.

Inlet line 420 is provided with a conventional check valve 424 disposed to permit a flow of liquid from pipe 420 into pipe 416 but to prevent an opposite flow and outlet pipe 422 is provided with a corresponding check valve 426 disposed to permit a flow from pipe 416 through outlet pipe 422 to prevent an opposite flow. It will be understood that where the system is used as a boiler feed, inlet pipe 420 may be suitably connected to the condensate return line and that pipe 422 may be suitably connected into the boiler.

A pipe 428 forms a connection between the inlet and discharge line 416 and the interior of the bellows or diaphragm element 396a, thus applying a variable expansive force thereto, one component of which is proportional to the static head pressure of the liquid in tank 370a. The exterior of element 396a is subjected to a substantially constant collapsing force due to the static head pressure of a column of liquid which stands in the pipe 430 and rises to a predetermined and substantially constant level in the surge tank 414. Pipe 430 is connected, as will be evident, into the housing 388a, of element 396a. The expansion and contraction of element 396a is thus effected in accordance with the differential between the substantially constant collapsing force applied thereto by the liquid in pipe 430 and in tank 414 and the variable expansive force applied thereto through the connection 428.

Accordingly, as the liquid level in tank 370a rises, element 396a correspondingly expands, forcing the connecting rod 392a thereof upwardly. The movement of rod 392a is communicated to the arm 130f of valve 24f through a bell crank 432, fulcrumed upon a pin 434 carried by a pivoted link 384a. Through this connection, an upward movement of rod 392a, which accompanies a rise of the liquid in tank 370a, causes arm 130f to move to the left, as viewed in Figure 13, which in accordance with the previously described constructions, ultimately actuates valve 24f from the illustrated venting position to the pressure position, closing off the vent pipe 96f and connecting the output line 204c to the pressure line 88f. Similarly, a fall of the liquid in tank 370a causes rod 392a to move downwardly, resulting in a movement to the right, as viewed in Figure 13, of arm 130f and ultimately causing the actuation of valve 24f from the pressure position to the venting position, closing off the pressure line 88f, and connecting the output line 204c to the vent pipe 96f.

Continuing with the description of the parts, the output line 204c of valve 24f branches, one branch 436 thereof being connected into the piston cylinder 438 of the relay valve 410, and the branch 440 being correspondingly connected into the piston cylinder 442 of the vent valve 412.

Referring to Figure 14, the relay valve 410 comprises a housing 450 divided into two chambers by a web 452, a passage through which is disposed to be opened and closed as hereinafter described by a valve 454. A pipe 456, connected into the chambers thus formed, extends into tank 370a to a point above the maximum level of the liquid therein, and serves to transmit the pumping pressure through valve 410 to tank 370a. A pipe 458 connected into the other chamber formed in the valve housing may lead to a suitable source of actuating pressure, which in the case of a boiler feed system as previously described may be the boiler itself.

Valve 454 is provided with a rod 460, connected at one end to a piston 462, which is reciprocable in the cylinder provided therefor in the housing and the other end of which extends outwardly of the valve casing through a suitable stuffing box 464 and is pivotally connected to a counterweight arm 466. Arm 466 is provided with a suitable weight 468, and is fulcrumed by pin 470 upon a link 472, which is in turn pivotally connected to the valve housing by a pin 474. Arm 466 thus acts to supply a constant opening bias to valve 454. It will be noted, as in the case of the previously described relay valve 202, that while the underside of piston 462 is subjected to the pressure applied thereto through the pilot valve 24f, the other side thereof is subjected to the pressure transmitted through the relay valve 410.

The vent valve 412 corresponds in all respects to valve 410 with the exception that the counterweight arm 480 thereof acts in a direction to hold the valve 482 in closed position, and that pressure applied to the underside of piston 484 through line 440 acts to close the valve 482. Valve 412 is connected by a line 486 to the surge tank 414, and is also provided with a vent pipe 488. When in the open position, accordingly, valve 412 vents surge tank 414 through pipes 486 and 488 and, because of the equalizing connection 490 which extends from a point in tank 370a above the maximum liquid level therein into surge tank 414, also serves to vent tank 370a.

Considering now the operation as a whole of the embodiment shown in Figure 13, pilot valve 24f is illustrated as occupying the venting position, to which position it was moved at the conclusion of a discharge of liquid from tank 370a. Under these conditions, the space beneath pistons 462 and 484 is vented through pipe 96f. Relay valve 410 is held in the closed position by the external pressure applied to the top of valve 454 through the pressure line 458, which pressure is superior to the opening bias applied to valve 454 by the counterweight arm 466. Similarly, vent valve 412 may be expected to be in the closed position, in which position it is held by the force applied thereto by the counterweight arm 480.

With the parts in the just stated condition, liquid is permitted to flow through pipe 416 into tank 370a through the inlet line 420. During the rise of the liquid in tank 370a, any pressure developed in lines 490 and 486 by the reduction in the space above the liquid in tank 370a supplies an opening bias to piston 484 of vent valve 412. This pressure, if above a predetermined value, forces valve 412 to the open position, venting pressure thus developed, and permitting valve 412 to reclose under the influence of arm 480.

The gradual rise of the liquid in tank 370a correspondingly increases the static head pressure applied to the interior of bellows element 396a through the connection 428, gradually expanding the latter, and causing valve arm 130f to correspondingly move to the left, as viewed in Figure 13. Ultimately, when a predetermined level of the liquid in tank 370a is reached, valve 24f is thrown to the pressure position, closing off the vent pipe 96f and connecting the outlet pipe 204c with the pressure pipe 88f which, in the case of the boiler feed system, may be connected directly into the boiler as previously described or, in other systems, may be connected to an independent source of pressure. Pressure thus supplied to outlet pipe 204c is distributed through pipes 436 and 440 to the pistons 462 and 484, causing piston 462 to move upwardly, opening valve 454, and causing valve 482 to close unless already closed by the force applied thereto through counterweight arm 480.

The closed condition of valve 482 closes off the vent line 486. The opening of valve 410 connects pipe 456 with the external supply pipe 458, thus supplying a pressure to the liquid in tank 370a, which pressure initiates a discharge from tank 370a of the liquid therein, closing check valve 424, and opening check valve 426. The pressure thus supplied to the liquid in tank 370a and transmitted to the underside of element 396a through pipe 428 is equalized by an equal pressure applied to the upper side of the bellows through the equalizing connection 490, so that the position of the bellows element is unaffected by the admission to tank 370a of the pumping pressure.

As the liquid level in the tank 370a falls, the expanding force on bellows element 396a gradually decreases, permitting a corresponding collapsing movement thereof, which results in a movement to the right of the valve arm 130f and ultimately actuates pilot valve 24f to the venting position, closing off the supply line 88f and opening the vent line 96f.

The venting movement of valve 24f vents the space beneath the piston 462, permitting the latter element to be forced downwardly to valve closing position by the combined back pressure in pipe 456 and the external pressure in pipe 458. Upon valve 454 reaching the closed position, the pressure in pipe 458 acts upon the upper surface thereof and maintains the valve in the closed position.

The venting of pressure from the underside of piston 484 correspondingly permits such element to be forced downwardly to valve opening position by the back pressure existing in line 486. The opening movement of valve 414 vents the pump tank 370a and the surge tank 414 through the vent pipe 488, thus reducing the back pressure in pipe 486 which, as just stated, is acting to hold valve 412 in the open position. Upon a complete venting of the pressure in the line, valve 412 again moves to the closed position under the influence of the counterweight arm 480, thus restoring the parts to the positions occupied thereby at the beginning of the pumping cycle, in which they are in readiness for a duplicate cycle.

As an alternative to the two separate valve structures 410 and 412 described above, the unitary valve structure 500, shown in Figure 16, may be utilized. Referring to Figure 16, valve 500 comprises a housing 502, within which a cylinder 504 is suitably supported, and which slidably receives a pair of opposed pistons 506 and 508. The rod 510 of piston 506 is connected to a valve 512 which closes off an associated passage at one end of the housing 102, which passage communicates with a vent pipe 488a, which corresponds in all respects to the vent pipe 488 described with reference to valve 412, and may be similarly associated with the surge tank 414 and the pump tank 370a. The piston rod 516 associated with piston 508 is provided with a valve 518 which closes off a passage at the other end of the valve housing, which passage affords communication between the valve and a pressure pipe 458a, which may correspond in all respects to the pressure pipe 458 described with reference to Figure 13.

The housing 502 also provides an outlet passage 522 into which an outlet pipe 456a is threaded, which outlet pipe corresponds in all respects to the outlet pipe 456 described with reference to Fig. 13, except that it may serve to both supply pressure to and vent pressure from the tank, the line 486 of Figure 13 thus being unnecessary. A web 524, which extends between the cylinder 504 and the housing 502, is provided with a passage 526, one end of which opens into the cylinder space between piston 508, and the other end of which communicates with a source of pilot pressure through a pipe 204d, which may correspond in all respects to the pipe 204c described with reference to Figure 13.

With the construction as just described, it will be understood that pressure admitted to valve 500 through the line 204d forces the two pistons 506 and 508 apart, to the limiting positions thereof, in which valve 512 is closed, and valve 518 is opened. The closure of valve 512 closes off the vent line 488a, and the opening of valve 518 admits pressure to the valve structure through pipe 458a, which is transmitted through the valve through the line 456a. Similarly, if pipe 204d is vented, which, as previously described, may occur when the liquid level in a tank associated with the valve falls to a predetermined minimum level, the space between pistons 506 and 508 is vented, permitting the pistons to be forced together by the force applied on the outer faces thereof by the pressure existing within the valve structure. This action opens the vent valve 512, venting pipe 456a through pipe 488a, and closes the pressure valve 518, thus closing off the pressure line 458a. The manner of utilizing valve 500 in the system of Figure 13, in substitution for the two valves 410 and 412, is thought to be evident from the foregoing without further description.

The remaining illustrated embodiment distinguishes from the embodiment of Figure 13 only in the method of loading the diaphragm element and accordingly, in Fig. 17, only those portions of the system which illustrate such differences are shown. The system of Figure 17 may be characterized in a broad sense by noting that the contracting or collapsing movements of the bellows or diaphragm element 396b are effected by tending to evacuate the space within it, which tendency is effected by so adjusting the parts, and by so relating the elevations of tank 370b and the diaphragm element that when the valve 24g is actuated to the venting position, the liquid being discharged from tank 370b stands in pipe 416a at a point below the level of the base of the diaphragm housing, such as the point represented by the line $x$. Accordingly, the fall of the liquid to this point tends also to evacuate the bellows element 396b, and correspondingly collapses the element. A rise of the liquid in tank 370b, on the other hand, refills the bellows element, causing it to expand as in the case of the system of Figure 13. Thus, expanding movements of the bellows, tending to cause movement of the pilot valve to a pressure position and which accompany a rise of the liquid in the pump tank, are effected by the positive static pressure head of the liquid in the closed tank, while collapsing movements of the bellows, tending to cause a venting movement of the pilot valve and which accompany a fall of the liquid in the tank, are effected by a vacuum or suction action upon the bellows element. In all other respects, the operation and construction of the system of Fig. 17 may be as described with reference to Fig. 13.

Although specific embodiments of the present invention have been disclosed herein, it will be evident that various changes in the form, number and arrangement of parts may be made within the spirit and scope thereof. It will also be evident that various features of the present invention may be utilized independently of other features thereof, and that the invention as a whole or in part may be applied to uses other than the specified uses. The foregoing description, accordingly, is to be considered in an illustrative and not in a limiting sense.

What is claimed is:

1. In a system for controlling the flow of liquid, a closed tank having inlet and outlet check valves associated therewith; means movably responsive to the liquid level in said tank; and a valve for controlling the admission to and venting of pressure from said tank comprising a pivoted valve operating member, an arm reciprocable back and forth across said member from one side of the pivot point thereof to the other and disposed to effect the pivoting thereof, means for preventing said pivoting except at predetermined limit positions of said arm, and a connection between said arm and said first mentioned means.

2. In a system for controlling the flow of liquid, the combination of a tank having inlet and outlet check valves associated therewith; means movably responsive to the level of the liquid in said tank; a pilot valve having an element directly movable by said means and pressure and vent valves controlled thereby; a relay valve having pressure and vent ports; means connecting said relay valve to said pilot valve for operation thereby; means connecting said relay valve to said tank so that when said relay valve is opened, pressure is admitted to said tank and when said relay vent valve is closed pressure is vented from said tank, and means for operating said pilot valve member comprising a pivoted valve operating member, an arm reciprocable back and forth across said member from one side of the pivot point thereof to the other and disposed to effect the pivoting thereof, means for preventing said pivoting except at predetermined limit positions of said arm, and a connection between said arm and said first mentioned means.

3. Valve mechanism comprising, in combination, a housing formed to provide a chamber having inlet and outlet passages; valve means movable to open and close certain of said passages; a pivoted member for effecting the movement of said valve means; an arm reciprocable back and forth across said pivoted member from one side of the pivot point thereof to the other and disposed to effect the pivoting thereof; and means for preventing pivoting movement of said member except when said arm approaches predetermined limit positions.

4. Relay valve mechanism comprising, in combination, a housing formed to provide a valve chamber and a cylinder, a piston reciprocable in said cylinder and having a piston rod; inlet and outlet valves in said housing; a lever pivoted in said housing having one end engageable by said piston rod and the other end engageable by one of said valves; an operating member for the other of said valves engageable by said piston rod for movement thereby; and a counter-weight connected to said lever for biasing it to a predetermined rotative position.

5. In a system for controlling the flow of liquid, means constituting a relatively large and a relatively small tank so related as to permit overflow from said larger tank into said smaller tank when the liquid in said larger tank rises to a predetermined level therein; means associated with said two tanks for correlating the fall of the levels of the liquids therein; mechanism movably positioned in said smaller tank and disposed to rise and fall therein respectively in accordance with the rise and fall of the liquid in said smaller tank; and valve means responsive to a liquid level increasing movement of said mechanism for admitting pressure to said larger tank and responsive to a liquid level lowering movement of said mechanism for venting pressure from said tank.

6. In a system for controlling the flow of liquid, means constituting a relatively large and a relatively small tank so related as to permit overflow from said larger tank into said smaller tank when the liquid in said larger tank rises to a predetermined level therein; means associated with said two tanks for correlating the fall of the levels of the liquids therein; mechanism movably positioned in said smaller tank and disposed to rise and fall therein respectively in accordance with the rise and fall of the liquid in said smaller tank; valve means responsive to a liquid level increasing movement of said mechanism for admitting pressure to said larger tank and responsive to a liquid level lowering movement of said mechanism for venting pressure from said tank; and means associated with said valve means for preventing actuation thereof except at predetermined maximum and minimum levels of the liquid in said smaller tank.

7. In a system for controlling the flow of liquid, means constituting a relatively large tank having a restricted outlet and a relatively small tank so related as to permit overflow from said larger tank into said smaller tank when the liquid in said larger tank rises to a predetermined level therein; mechanism movably responsive to the rise and fall of the liquid in said smaller tank; valve means responsive to a liquid level increasing movement of said mechanism for admitting pressure to said larger tank and responsive to a liquid level lowering movement of said mechanism for venting pressure from said tank; means associated with said valve means for preventing actuation thereof except at predetermined maximum and minimum levels of the liquid in said smaller tank; and means correlating the falls of the levels of the liquids in said tanks so that when the liquid in said smaller tank has fallen to said minimum value, the liquid level is in said restricted portion of said larger tank.

8. In a system for controlling the flow of liquids, a tank; inlet and outlet means for admitting liquid to and discharging liquid from said tank respectively; means for measuring the pressures in said inlet and outlet means; and means responsive to a predetermined increase of said outlet pressure relative to said inlet pressure for admitting pressure to said tank and responsive to a predetermined decrease of said outlet pressure relative to said inlet pressure for venting pressure from said tank.

9. In a system for controlling the flow of liquids by the admission to and venting of pressure from a tank; inlet and outlet means for admitting liquid to and discharging liquid from said tank respectively; means for measuring the pressures in said inlet and outlet means; and means including an expansible and contractible element movably responsive to the differential between said pressures for controlling said first mentioned pressure.

10. A system adapted for controlling the flow of relatively high temperature liquid through a tank by the admission to and venting of pressure from the tank, comprising in combination, a supply line for supplying said liquid to said tank;

a second supply line for supplying make-up liquid to said tank; an element movably responsive to the liquid level in said tank and valve mechanism controlled thereby for controlling said pressure; and means including a heat exchange device associated with said supply and make-up lines in which said make-up liquid functions as a cooling agent for reducing the temperature of the liquid in said supply line.

11. In a system for controlling the flow of liquid by the admission to and venting of pressure from a closed tank, the combination of means for admitting liquid to and discharging liquid from said tank; a movable element; means for subjecting one side of said element to the static head pressure of the liquid in said closed tank; additional means for subjecting the other side of said element to a predetermined load opposing said static head pressure; an equalizing connection for subjecting said other side of said element to the pressure in said tank but not to the said static head; and valve mechanism actuated by movement of said element for admitting said first named pressure to said tank upon a rise of the liquid therein and for venting said first named pressure from said tank upon a fall of the liquid therein.

12. In a system for controlling the flow of liquid by the admission to and venting of pressure from a closed tank, the combination of means for admitting liquid to and discharging liquid from said tank; a movable element; means for subjecting said element to the static head pressure of the liquid in said closed tank; additional means comprising a supplemental tank independent of said liquid static pressure for subjecting said element to a predetermined load opposing said static head pressure; and valve mechanism actuated by movement of said element for admitting said first named pressure to said tank upon a rise of the liquid therein and for venting said first named pressure from said tank upon a fall of the liquid therein.

13. In a system for controlling the flow of liquid by the admission to and venting of pressure from a closed tank, the combination of means for admitting liquid to and discharging liquid from said tank; a movable element and a housing therefor; means for subjecting said element to the static head pressure of the liquid in said closed tank to cause movement thereof in one direction; means for subjecting said element to the pressure in said tank in opposition to said static head pressure said closed tank and said housing being so correlated as to relative position that as the liquid falls in said closed tank said housing is evacuated and said element moved by suction action; and valve mechanism controlled by movement of said element for controlling said first named pressure.

14. In a system for controlling the flow of liquid, means constituting a relatively large and a relatively small tank interconnected to permit overflow from said larger tank into said smaller tank when the liquid in said larger tank rises to a predetermined level therein; means associated with said two tanks for correlating the fall of the levels of the liquids therein; mechanism movably responsive to the rise and fall of the liquid in said smaller tank; a reciprocable valve arm directly movable by said mechanism; a pivoted member disposed to be pivoted by said arm, means to prevent pivoting of said member except when said arm reaches predetermined limit positions, a pilot valve actuated by a pivoting of said member, and relay valve including a piston controlled by said pilot valve and disposed to admit and exhaust pressure from said larger tank.

15. In a system for controlling the flow of liquids by the admission to and venting of pressure from a tank; inlet and outlet means for admitting liquid to and discharging liquid from said tank respectively; means for measuring the pressures in said inlet and outlet means; means including an expansible and contractible element movably responsive to the differential between said pressures; a pilot valve having a reciprocable arm movable by said element, a pivoted member pivotable upon predetermined movement of said arm and a valve member actuable by said pivoted member; and a relay valve having a piston movably responsive to said valve member and disposed to control said first mentioned pressure.

16. In a system for controlling the flow of liquid, a tank having inlet and outlet check valves associated therewith; valve means for controlling the admission to and venting of pressure from said tank; an element movably responsive to the level of the liquid in said tank; an operating mechanism for said valve means disposed for movement by said element and comprising a pivoted member for effecting the movement of said valve means, an arm reciprocable back and forth across said pivoted member from one side of the pivot point thereof to the other and disposed to effect the pivot thereof, and means for preventing pivoting movement of said member except when said arm approaches predetermined limit positions.

17. In a system for controlling the flow of liquid by the admission to and venting of pressure from a liquid container, means constituting a relatively large and a relatively small container so related as to permit overflow from said larger container into said smaller container when the liquid in said larger container rises to a predetermined level therein; means including a first valve for supplying the liquid to said larger container, means associated with said two containers for correlating the fall of the levels of the liquids therein; an element movably responsive to the liquid level of the smaller container; a valve operating member responsive to the movement of said element; means preventing movement of said valve operating member except when the liquid level of the smaller container reaches predetermined maximum and minimum values; and valve means responsive to movement of said valve operating member for controlling said pressure and for actuating said first valve.

18. In a system for controlling the flow of liquid, the combination of a closed tank and means for admitting liquid to and discharging liquid from said tank; a diaphragm chamber; means connecting said chamber to the said closed tank so that one side of said diaphragm is subjected to the static head pressure of the liquid in the said closed tank; means for subjecting said diaphragm to a substantially constant load opposing said static head pressure; and for subjecting the other side of said diaphragm to the pressure in said tank but not to said static head pressure; and valve mechanism actuated by said diaphragm so that pressure is admitted to said tank when the rise of the liquid therein causes the diaphragm to move in one direction and pressure is vented from said tank when the fall of the liquid therein causes the diaphragm to move in the opposite direction.

19. In a system for controlling the flow of liquid by the admission to and venting of pressure from a closed tank, the combination of means for admitting liquid to and discharging liquid from said tank; a movable element; means for subjecting said element to the static head pressure of the liquid in said closed tank; means for subjecting the said element to a predetermined load and to the pressure in said tank opposing said static head pressure; and valve mechanism actuated by said element for admitting said first named pressure to said tank upon a rise of the liquid therein and for venting said first named pressure from said tank upon a fall of the liquid therein.

20. Valve mechanism comprising, in combination, a housing formed to provide a chamber having inlet and outlet passages; valve means movable to open and close certain of said passages; a pivoted member for effecting the movement of said valve; an arm reciprocable back and forth across said pivoted member from one side of the pivot point thereof to the other and disposed to effect the pivoting thereof; a pair of latches, one thereof disposed to prevent pivoting of said pivoted member in one direction and the other thereof disposed to prevent pivoting of said pivoted member in the other direction; and a member carried by said arm and disposed to engage one of said latches as one limiting position of said arm is approached to release said one latch and to engage the other of said latches as the other limiting position thereof is approached to release said other latch.

ALFRED C. PAGE.